United States Patent Office 2,988,126
Patented June 13, 1961

2,988,126
INFLATION VALVE ASSEMBLIES AND ADAPTORS FOR PNEUMATIC TYRES
William Neil Wells, Lichfield, and Raymond George Clifton, Walsall, England, assignors to Dunlop Rubber Company Limited, County of London, England, a British company
Filed Aug. 5, 1958, Ser. No. 753,364
Claims priority, application Great Britain Aug. 20, 1957
2 Claims. (Cl. 152—427)

This invention relates to inflation valve assemblies and adaptors for pneumatic tyres.

According to the invention, an inflation valve adaptor comprises a head portion for clamping against the outer peripheral surface of a rim, a cylindrical body portion for insertion through an aperture in the rim, said body portion being screw-threaded and having a nut for engagement therewith to clamp the head portion against the rim, an inflation passage extending axially through the head portion and having a side connection, and means for air-tightly sealing the adaptor with a wheel rim.

According to the invention also, a wheel assembly comprises a wheel having a rim portion and an inflation valve adaptor, the said adaptor having a head portion adjacent to one end engaging the outer peripheral surface of a rim and a body portion projecting inwardly of the wheel through a hole in the rim, the body portion having a screw-thread and nut for clamping the adaptor air-tightly to the rim and being provided with an axially extending inflation passage having a side connection for connecting to an inflation valve.

The valve adaptor may either be clamped air-tightly to the rim of a wheel carrying a tubeless tyre or be air-tightly connected to a wheel rim and to an inner tube for a tyre cover mounted on the rim.

Two embodiments of the invention will now be described, by way of example, with reference to the accompanying drawings, in which.

Figure 1:
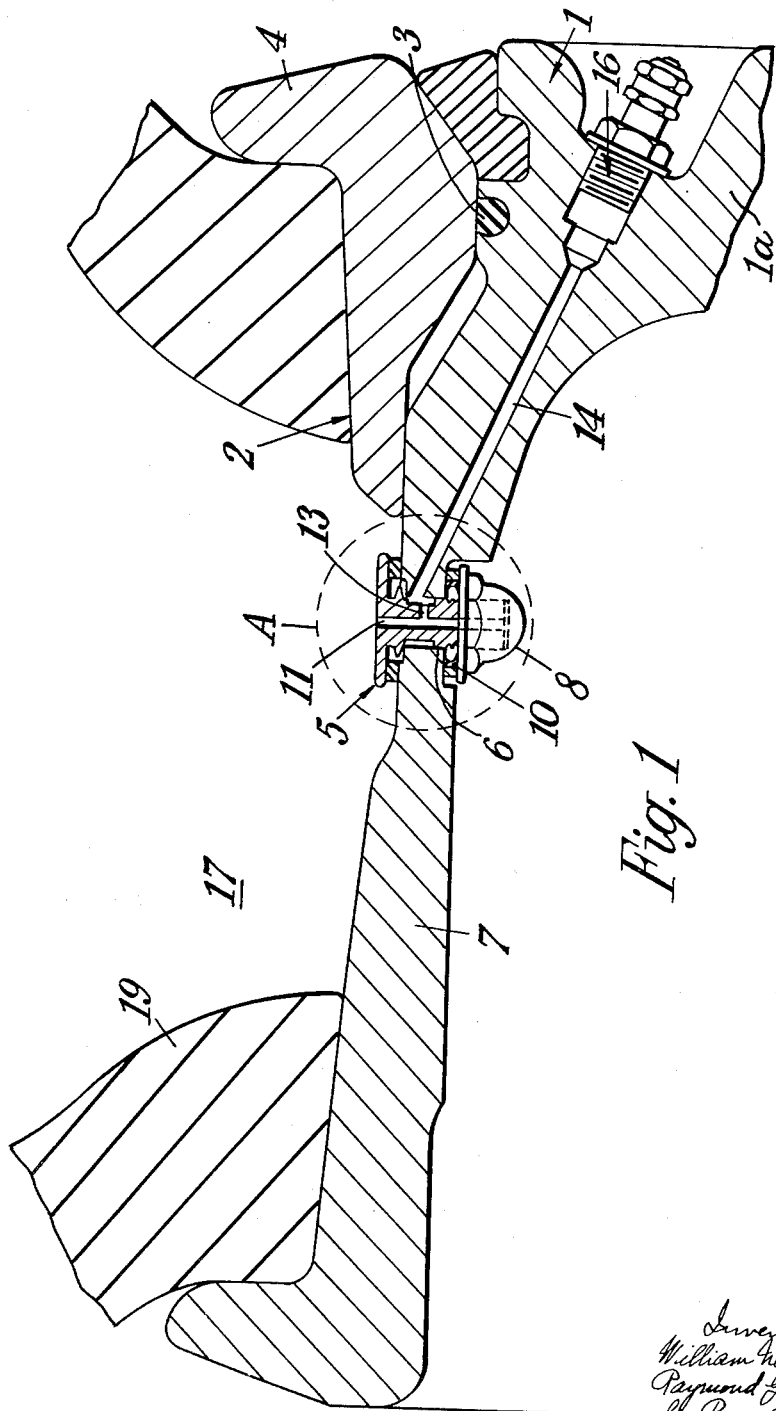
FIGURE 1 is an axial cross-sectional view of part of an aircraft wheel assembly and tubeless tyre.
Figure 2:
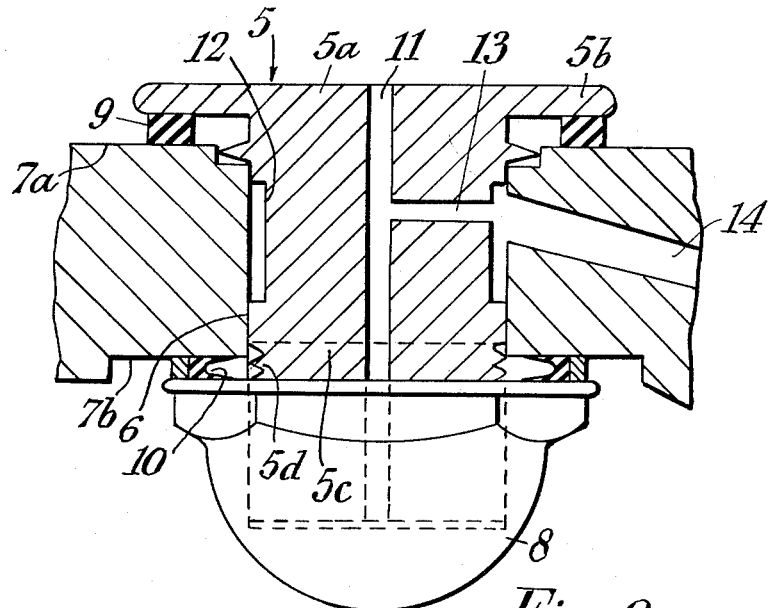
FIGURE 2 is an enlarged cross-sectional view of the part indicated by A in FIGURE 1.

In the embodiment shown in FIGURES 1 and 2 an aircraft wheel 1, of known type and having a three-piece rim 2, is provided with a sealing ring 3, for preventing the escape of air past the detachable flange 4 when a tubeless tyre is mounted on the wheel.

An inflation valve adaptor 5 is mounted in an aperture 6 provided in the rim base 7 of the wheel. The adaptor 5 (see FIGURE 2) is provided on one end with a head portion 5a, having an annular flange 5b, and a body portion 5c, which extends through the aperture 6, having a screw-thread 5d and cap nut 8, annular rubber seals 9 and 10 respectively being provided between the head portion 5a and the outer peripheral surface 7a of the rim base 7 and also between the inner peripheral surface 7b of the rim base and the cap nut 8.

An axially-extending passage 11 is provided in the adaptor 5 one end of which extends through the head portion 5a of the adaptor 5, the other end extending through the screw-threaded portion of the adaptor and being sealed-off by the cap nut. An annular recess 12 is formed on the outer periphery of the adaptor and a side connection 13 is formed in the adaptor connecting the annular recess 12 with the axially extending passage 11.

A passageway 14 is formed in the body of the wheel 1 and extends from the side portion 1a thereof, the passageway being screw-threaded at this end, and leads into the space formed by the annular recess 12 in the adaptor and the wall of the aperture 6. An inflation valve 16 having a screw-threaded end is screwed into the end of the passageway 14, the inflation valve 16 communicating through the passageway 14, the annular recess 12, the side connection 13 and the axial passage 11 with an air chamber 17 within a tubeless tyre 19 mounted on the wheel.

Figure 4:
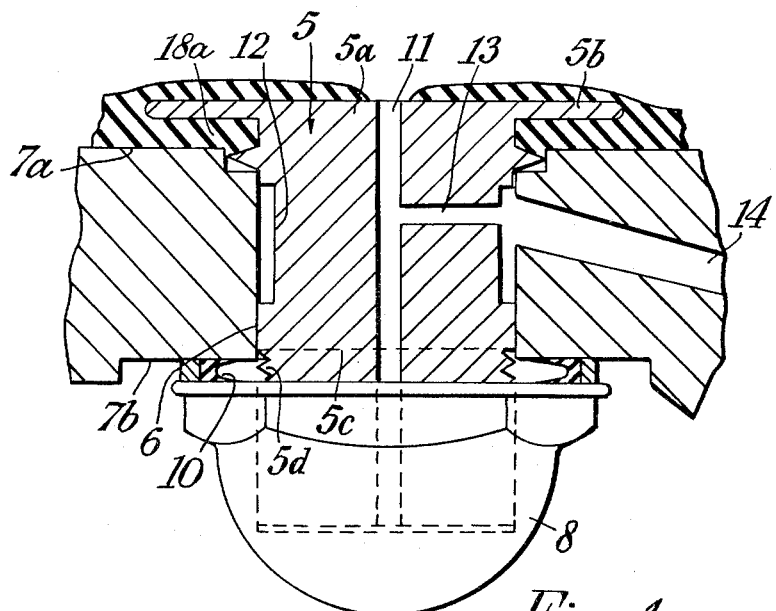
FIGURE 4 is an enlarged cross-sectional view of the part indicated by B in FIGURE 3.
Figure 3:
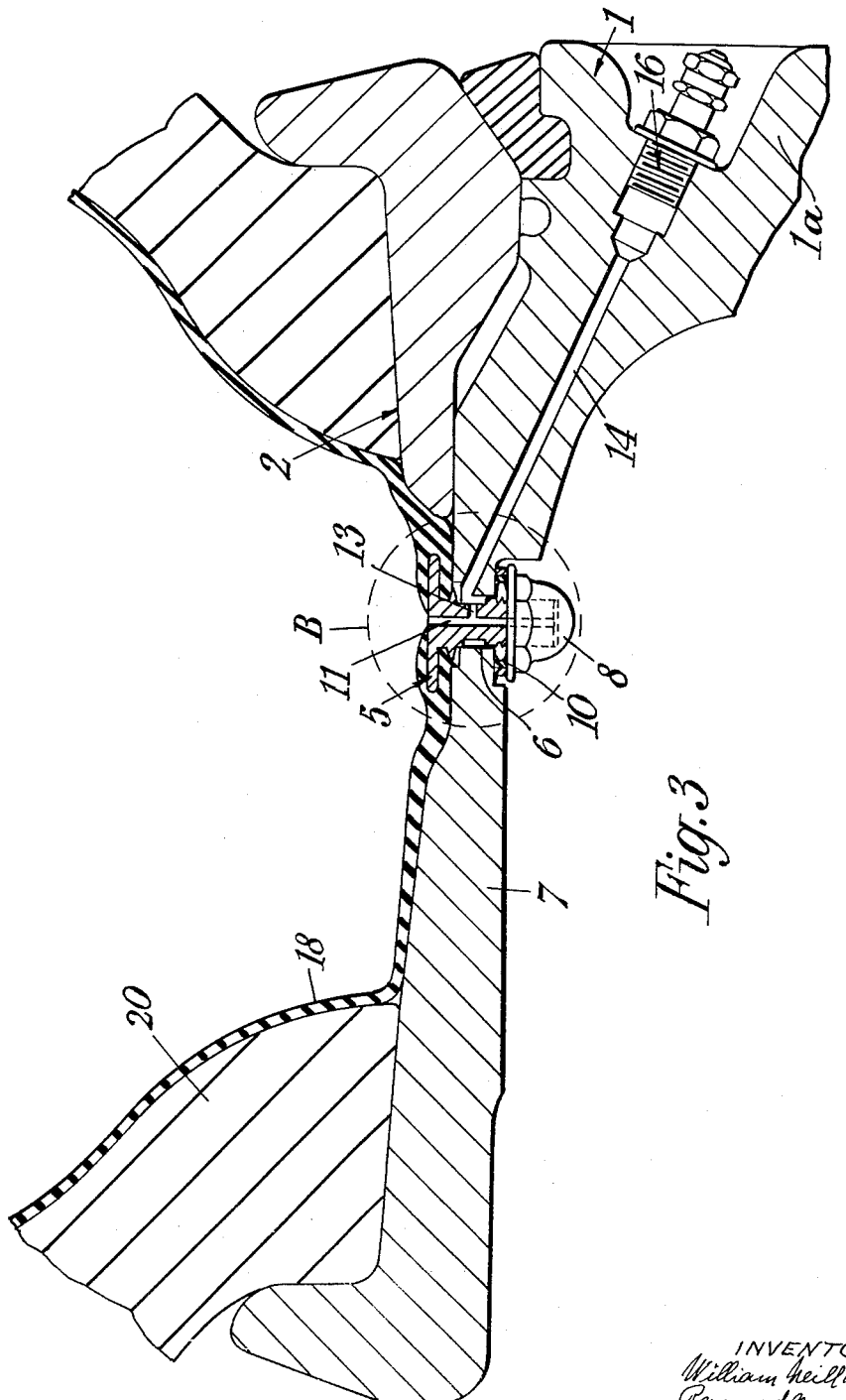
FIGURE 3 is an axial cross-sectional view of part of a wheel assembly, showing part of an inner tube and tyre cover in position on the rim.

In an alternative construction shown in FIGURES 3 and 4 the head portion 5a of the valve adaptor 5 is vulcanised integrally to the base of an inner tube 18 for a tyre cover 20 mounted on the wheel 1. In this instance, the annular seal 9 provided in the previous construction is replaced by the rubber of the inner tube base 18a which extends between the flange 5b and the surface 7a. A seal such as has been described may be used in addition to the rubber of the inner tube base.

It is an advantage of the present invention that a single adaptor may be utilised in any of the several different instances described above resulting in standardization of valve fittings both for tubeless and tubed tyres.

In accordance with constructions of the present invention there are no complications in wheel design such as exist when a long valve stem, moulded integrally with the tube, is utilised necessitating slotting or other machining of the rim base to allow for fitting of the cover and tube assembly to the wheel.

In consequence wheel strength is unimpaired, and the wheel is, in contrast, suitable for tubeless or tubed assemblies. In addition the need for cover and tube balancing, necessary for the long valve stem construction, is greatly reduced.

Moreover, the risk of damage of the assembly in accordance with the invention is considerably less than with the prior construction referred to.

A further advantage in accordance with the invention is that comparative freedom of brake design is achieved since no restrictions are imposed thereon by the wheel assembly.

Having now described our invention—what we claim is:
1. An inner tube and wheel assembly which comprises a wheel rim having an opening therethrough, an inner tube about the outer surface of said rim and having an opening coaxial with the opening in said wheel rim, an inflation valve adaptor comprising a head engaging said inner tube about said opening in position to clamp said inner tube about said opening to said wheel rim, said adaptor having a body portion extending through said wheel rim, said body portion being screw threaded at the end projecting through said wheel rim, a nut mounted on the threaded portion of said adaptor to clamp said head and portion of said inner tube about said opening fluid-tightly to the rim of said wheel, said adaptor having a radially extending opening through said head and sidewise through said body portion, said rim having a passageway therein from said sidewise passage to the edge of said rim and an inflation valve mounted in said passage at the edge of said rim.

2. A tubeless tyre and wheel assembly comprising a wheel rim having an opening therethrough and a passageway from said opening to a side of said rim, an inflation valve adaptor comprising a head portion engaging the outer periphery of said rim about said opening to close said opening, and having a body portion extending through said opening, said adaptor having an inflation passage extending axially through said head portion into said body portion and having a side passage connecting said axial passage with said passageway in said wheel rim and an inflation valve at the end of said passageway, said body portion being screw threaded, a nut threaded on said body portion to clamp the head portion of said adaptor against said rim about said opening and means for air-tightly sealing said adaptor to said rim.

References Cited in the file of this patent

UNITED STATES PATENTS

| | | |
|---|---|---|
| 1,540,512 | Carroll | June 2, 1926 |
| 2,152,366 | Smith | Mar. 28, 1939 |
| 2,339,381 | Crowley | Jan. 18, 1944 |
| 2,608,235 | Wyman | Aug. 26, 1952 |